(12) United States Patent
Tran et al.

(10) Patent No.: US 9,237,295 B2
(45) Date of Patent: Jan. 12, 2016

(54) SYSTEM AND METHOD FOR KEYFRAME ANALYSIS AND DISTRIBUTION FROM BROADCAST TELEVISION

(75) Inventors: Dang Van Tran, Laguna Niguel, CA (US); Richard Whitney, Irvine, CA (US); Toshiro Ozawa, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 12/252,301

(22) Filed: Oct. 15, 2008

(65) Prior Publication Data

US 2010/0095329 A1 Apr. 15, 2010

(51) Int. Cl.

| | |
|---|---|
| *G06F 3/00* | (2006.01) |
| *G06F 13/00* | (2006.01) |
| *H04N 5/455* | (2006.01) |
| *H04N 5/445* | (2011.01) |
| *H04N 21/232* | (2011.01) |
| *H04N 21/2343* | (2011.01) |
| *H04N 21/235* | (2011.01) |
| *H04N 21/25* | (2011.01) |
| *H04N 21/258* | (2011.01) |
| *H04N 21/435* | (2011.01) |
| *H04N 21/4402* | (2011.01) |
| *H04N 21/472* | (2011.01) |
| *H04N 21/4788* | (2011.01) |

(Continued)

(52) U.S. Cl.
CPC ....... *H04N 5/44543* (2013.01); *H04N 5/44591* (2013.01); *H04N 21/232* (2013.01); *H04N 21/235* (2013.01); *H04N 21/234363* (2013.01); *H04N 21/252* (2013.01); *H04N 21/25866* (2013.01); *H04N 21/435* (2013.01); *H04N 21/440263* (2013.01); *H04N 21/4788* (2013.01); *H04N 21/47214* (2013.01); *H04N 21/47217* (2013.01); *H04N 21/4821* (2013.01); *H04N 21/6581* (2013.01); *H04N 21/84* (2013.01); *H04N 21/8455* (2013.01)

(58) Field of Classification Search
CPC .......... H04N 21/44222; H04N 21/482; H04N 21/84; H04N 5/44543; H04N 21/4532; H04N 21/4788; H04N 21/812; H04N 5/76; H04N 21/4334; H04N 21/44008; H04N 21/6581; H04N 21/8455; H04N 5/47217; H04N 21/4821
USPC ..................... 375/240.01–240.29; 725/37–61
See application file for complete search history.

(56) References Cited

U.S. PATENT DOCUMENTS

| | | | | |
|---|---|---|---|---|
| 5,926,230 | A * | 7/1999 | Niijima et al. | 725/56 |
| 6,236,395 | B1 * | 5/2001 | Sezan et al. | 715/723 |

(Continued)

OTHER PUBLICATIONS

Final Office Action dated Dec. 5, 2011 from U.S. Appl. No. 12/435,319.

(Continued)

*Primary Examiner* — Pankaj Kumar
*Assistant Examiner* — Alazar Tilahun
(74) *Attorney, Agent, or Firm* — Sherman IP LLP; Kenneth L. Sherman; Hemavathy Perumal (57) ABSTRACT

Embodiments of keyframe analysis and distribution from broadcast television are disclosed. For example, embodiments include methods and systems of sharing video frame data over a data network to provide features that may include improved program guides, parental or other monitoring of televisions or other video receivers, and sharing of user identified frames or scenes of video programs.

44 Claims, 10 Drawing Sheets

(51) Int. Cl.
*H04N 21/482* (2011.01)
*H04N 21/658* (2011.01)
*H04N 21/84* (2011.01)
*H04N 21/845* (2011.01)

(56) References Cited

U.S. PATENT DOCUMENTS

| | | | |
|---|---|---|---|
| 6,584,463 | B2 | 6/2003 | Morita et al. |
| 7,487,524 | B2 | 2/2009 | Miyamori |
| 7,783,154 | B2 | 8/2010 | Wilkins et al. |
| 7,979,879 | B2 | 7/2011 | Kazama et al. |
| 8,199,813 | B2 | 6/2012 | Bendall et al. |
| 2002/0027615 | A1* | 3/2002 | Ohtsuki ............ 348/561 |
| 2003/0093790 | A1* | 5/2003 | Logan et al. ........ 725/38 |
| 2003/0115607 | A1* | 6/2003 | Morioka et al. ...... 725/61 |
| 2003/0177493 | A1 | 9/2003 | Hirose |
| 2004/0060059 | A1 | 3/2004 | Cohen |
| 2004/0117831 | A1 | 6/2004 | Ellis et al. |
| 2005/0091686 | A1* | 4/2005 | Sezan et al. ........ 725/46 |
| 2006/0218617 | A1* | 9/2006 | Bradstreet et al. .... 725/135 |
| 2006/0271960 | A1* | 11/2006 | Jacoby et al. ........ 725/46 |
| 2007/0180463 | A1 | 8/2007 | Jarman |
| 2007/0245368 | A1 | 10/2007 | Kawai |
| 2007/0265720 | A1 | 11/2007 | Sako |
| 2008/0022322 | A1 | 1/2008 | Grannan et al. |
| 2008/0082921 | A1* | 4/2008 | Negi ............ 715/704 |
| 2008/0155627 | A1* | 6/2008 | O'Connor et al. ..... 725/109 |
| 2008/0159708 | A1* | 7/2008 | Kazama et al. ........ 386/69 |
| 2009/0150947 | A1 | 6/2009 | Soderstrom |
| 2010/0175088 | A1 | 7/2010 | Loebig et al. |

OTHER PUBLICATIONS

Office Action dated Jun. 28, 2011 from U.S. Appl. No. 12/435,319.
U.S. Restriction Requirement for U.S. Appl. No. 12/435,303 mailed Aug. 14, 2012.
U.S. Non-Final Office Action for U.S. Appl. No. 12/435,303 mailed Oct. 12, 2012.
U.S. Final Office Action for U.S. Appl. No. 12/435,303 mailed Apr. 15, 2014.
U.S. Non-Final Office Action for U.S. Appl. No. 12/435,303 mailed Dec. 27, 2013.
U.S. Non-Final Office Action for U.S. Appl. No. 12/435,303 mailed Sep. 26, 2014.
U.S. Advisory Action for U.S. Appl. No. 12/435,303 mailed Jul. 7, 2015.
U.S. Final Office Action for U.S. Appl. No. 12/435,303 mailed Apr. 27, 2015.
U.S. Final Office Action for U.S. Appl. No. 12/435,303 mailed Dec. 14, 2012.
U.S. Non-Final Office Action for U.S. Appl. No. 12/435,303 mailed Oct. 5, 2015.

* cited by examiner

SYSTEM AND METHOD FOR KEYFRAME ANALYSIS AND DISTRIBUTION FROM BROADCAST TELEVISION

BACKGROUND OF THE INVENTION

1. Field of the Invention

This application relates to interaction with televisions and other video playback devices.

2. Description of the Related Technology

Televisions and other video receivers often include network interfaces to provide household and internet related features. Generally, such networking features have been used to download content to televisions. However, a need exists for additional applications that take advantage of networking features of video receivers.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include methods and systems of sharing video frame data over a data network to provide functions that may include improved program guides, parental monitoring, sharing of user identified frames or scenes of a video program.

One embodiment includes a method of displaying a program guide. The method includes receiving program guide data indicative of at least one video program, receiving, via a data communications network, a plurality of reduced size images indicative of respective frames of the video program, and displaying a program guide. Displaying the program guide includes displaying at least a portion of the program guide data indicative of the video program and displaying each of the plurality of reduced size images for a respective time period.

One embodiment includes a system for displaying a program guide. The system includes a receiver configured to receive program guide data indicative of at least one video program, and receive, via a data communications network, a plurality of reduced size images indicative of respective frames of the video program. The system further comprises a display generator configured to generate a display of a program guide, wherein the display generator is configured to: generate a display of at least a portion of the program guide data indicative of the video program generate a display of each of the plurality of reduced size images for a respective time period and output the generated display.

One embodiment includes a method of providing a program guide. The method includes receiving program guide data indicative of at least one video program, receiving a plurality of reduced size images indicative of respective frames of the video program, selecting at least one of the reduced sized images based at least in part on data associated with the video program, and communicating the selected at least one of the reduced size images in connection with the program guide data.

One embodiment includes a computer-program product for viewing a video program. The product includes a computer-readable medium having stored thereon codes executable by at least one processor to receive at least one marker associated with a video program. The marker includes a plurality of reduced size images indicative of respective frames of a video program having a specified duration. Each of the images is associated with a respective time within the specified duration. The codes further cause a processor to display a time line indicative of the specified duration and display each of the images at a position relative to the displayed timeline.

One embodiment includes a method of viewing a video program. The method includes receiving at least one marker associated with a video program. The marker includes a plurality of reduced size images indicative of respective frames of a video program having a specified duration. Each of the images is associated with a respective time within the specified duration. The method further includes displaying, a time line indicative of the specified duration, and displaying each of the images at a position relative to the displayed timeline indicative of the time offset associated with the images.

One embodiment includes a method of monitoring viewing of a video receiver. the method includes identifying, on an electronic device, at least one video receiver that is in communication with the electronic device via a data network, receiving at least one reduced size image indicative of a frame of a video program displayed on the identified receiver, and displaying the at least one reduced size image and data indicative of the identified video receiver, on a display of the electronic device.

One embodiment includes a system for monitoring viewing of a video receiver. The system includes a receiver configured to receive at least one reduced size image indicative of a frame of a video program displayed on a video receiver via a data network and a processor configured to identify the at least one video receiver that is in communication with the electronic device via the data network and generate a display of the at least one reduced size image and data indicative of the identified video receiver. The system may further include a display device configured to display the generated display.

One embodiment includes method of sharing information about video programs. The method includes receiving, on a video receiver, user input identifying at least one frame of a video program and communicating a marker comprising data indicative of the frame and the video program over a data network to a specified electronic device.

One embodiment includes a method of providing information about video programs. The method includes receiving a request for markers associated with a video program and selecting at least one marker from database of a plurality of markers associated with a plurality of respective video programs in response to the request. Each of the markers is associated with at least one key frame of the video program. The method further includes communicating the selected at least one marker in response to the request.

On embodiment includes a system for sharing information about video programs. The system includes a display configured to display a video program, at least one input device configured to receive user input identifying at least one frame of a video program, and a transceiver configured to communicate a marker comprising data indicative of the reduced size image over a data network to a specified electronic device.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Networking features of televisions and other video receivers have been used to download content to such devices. However, once in place, networked video receivers can be configured to provide numerous improvements to existing video interfaces.

For example, in one embodiment, a program guide is provided that includes reduced size images indicative of frames of the corresponding video programs. In one embodiment, such frames can be selected for inclusion by the program provider or program guide provider. in another embodiment, such frames can be identified and/or provided by other viewers of the program. Such user identified frames may be indicative of particular actors, locales, popular scenes, etc. in the video program so as to provide the program guide viewer with visual information about the programs listed in the guide. In one embodiment, a plurality of reduced size images for a particular video program is displayed, for example, in a loop and/or periodically, to provide a slideshow or animation in the corresponding program guide entry.

In one embodiment, video receivers are configured to provide a user interface for users to mark scenes of a particular video program and communicate marker data to other viewers or to a database for distribution via a program guide or other applications. In one embodiment, the marker data includes reduced size images indicative of one or more frames of the video program.

In another embodiment, a video receiver communicates via a data network with one or more other video receivers to receive reduce sized images indicative of frames of video being displayed by the other video receivers. The video receiver displays such frames along with information indicative of the corresponding video receiver so as to provide a viewer such as a parent a way of monitoring what programs are being viewed on the other video receivers. In one embodiment, instead of a video receiver, a mobile handset or laptop displays the monitoring data thereby providing such monitoring from any networked location.

In another embodiment, a video receiver receives one or more sets of reduced sized images corresponding to respective time offsets during the time period of all or a portion of a video program. The receiver displays the sets of images at a position along a displayed timeline to indicate the relative time position in the program of the images. In one embodiment, the sets of images are provided based on markers of the viewer or other viewers. The markers may further comprise a caption or other data such as data indicative of the identity of the viewer who generated the marker. Such additional data may be displayed proximal the respective images.

Figure 1:
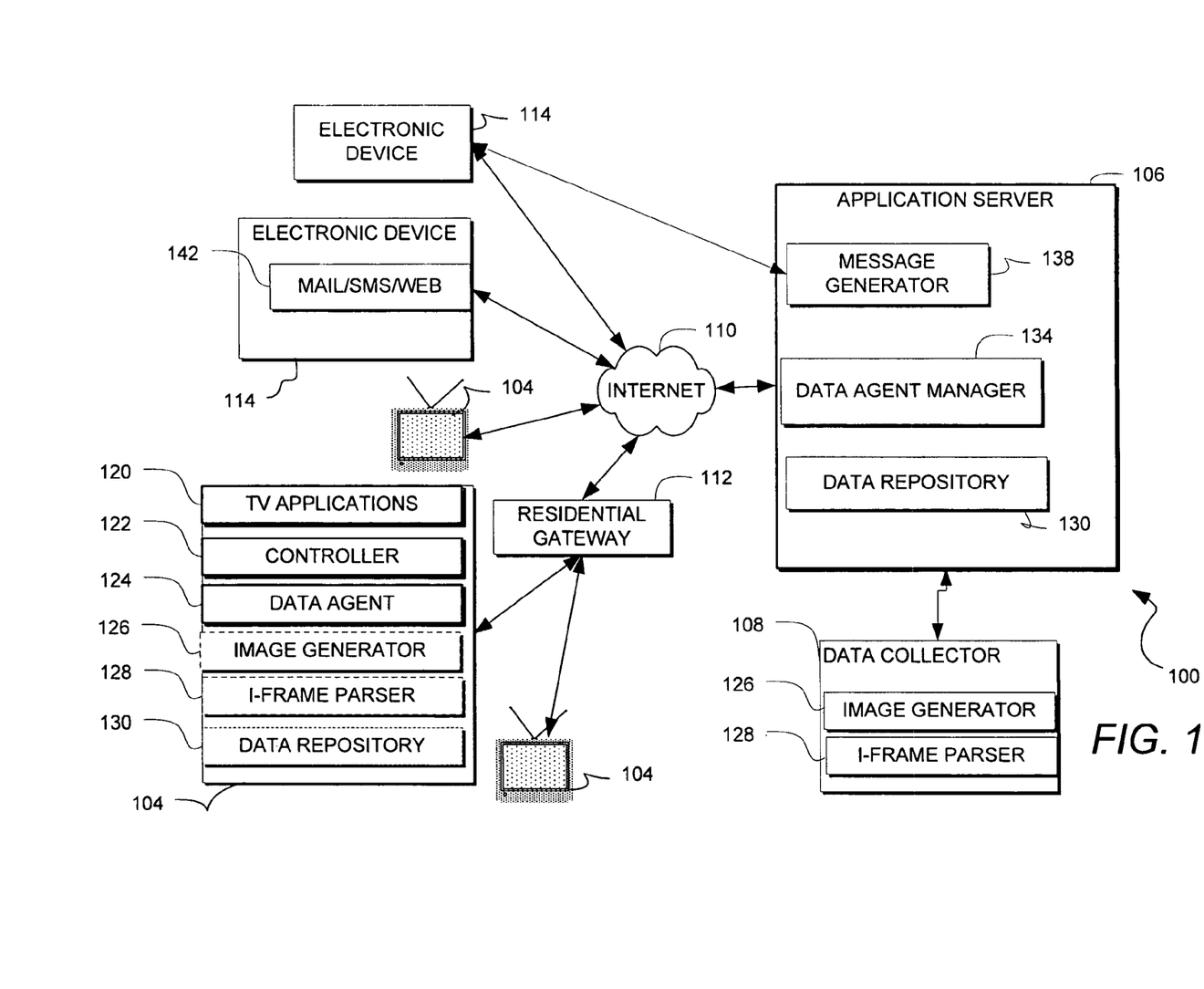
FIG. 1 is a block diagram illustrating components of one embodiment of a system for keyframe analysis and distribution of video programs such as from broadcast television.

FIG. 1 is a block diagram illustrating components of one embodiment of a system 100 for keyframe analysis and distribution of video programs such as from broadcast television to provide one or more of the embodiments described above. The system 100 includes one or more televisions or other video access devices 104 connected via a network 110. In one embodiment, the system 100 further includes an application server 106 in communication with televisions 104 via the network 110. One or more data collectors 108 may be configured to provide reduce sized images based on frames of video programs. In one embodiment, the data collectors 108 may communicate with the application server 106 and/or the televisions 104 via the network 110 or via a separate network.

The televisions 104 may include one or more TV application modules 120 configured to perform one or more of the application described herein with reference to FIG. 2, 4, 6, or 8, a controller module 122 configured to provide shared control features and interface reduced size images from video programs with the TV application modules 120, a data agent module 124 configured to obtain reduced size images either from a image generator 126 of the particular television 104, from a data repository 130 of the particular television 104, from such modules of another television 104, from a data repository 136 of the application server 106, or from a data collector 108 that includes its own image generator 126. The image generator 126 is configured to generate reduced size images from an associated I-Frame (or keyframe) parser 128. The data repository 130 may comprise an organized store of reduced size images for one or more video programs. The data repository 130 may comprise a searchable database that can be searched based on data such as captions or other data associated with images and video program data, including program data such as included in program guides including title, actors, director, other credits, locale, story description, etc.

The image generator 126 may be configured to generate reduced size images of all keyframes provided by the parser 128 or selected frames in response to requests from the application modules 120 for frames proximal particular time codes (e.g., time offsets) within the respective video program. The reduced size images may be generated in any suitable video or image format such as JPEG. In one embodiment, the frames have a vertical resolution of one of 480, 720, or 1080 lines (progressive scanned or deinterlaced from interlaced frames) and the reduced size images generated from such frames have a vertical resolution of less than 480 lines, e.g., 160, 240, or 320 lines. In one embodiment, the parser 128 provides only I-frames or keyframes. In one embodiment, the parser 128 may also be configured to provide predictor or interpolated frames, for example, when a keyframe is not proximal (within a specified threshold time period) of the requested time code within the video program.

It is to be recognized that while certain embodiments are described herein with reference to the access device 104 comprising a television (e.g., a video monitor and broadcast television receiver), in other embodiments, the access device 104 may be embodied as one or more of a video monitor (e.g., without receivers), a cable or satellite set-top boxes comprising a video receiver but not a display, a digital video recorder (DVR), a video disc player (e.g., DVD or other format discs including high definition discs), a mobile telephone handset, or any other multimedia access device. Moreover, a particular system 100 may include any number and type of such access devices 104.

The application server 106 may comprise a separate electronic device that coordinates usage control by the televisions 104 via the network 110, which may comprise the Internet. In other embodiments, the application server 106 may be integrated with one or more of the televisions 104. In one embodiment, one or more televisions 104 may communicate with the application server 106 (and via the network 110) via one or more routers such as a residential network gateway 112. The residential network gateway 112 may comprise one or more of an IP router, a cable modem, a DSL modem. One or more electronic devices 114 may also be configured to communicate with one or both of the televisions 104 and the application server 106.

The application server 106 may includes a data agent manager 134 configured to provide data such as reduced sized images from the data repository 130 to the data agents 124 of televisions 104. In addition, the data agent manager 134 may be further configured to program guide data, coordinate central storage of other data for the application modules 120 of the televisions 104, and/or include sub-modules (now shown) to provide other services to the televisions 104 for implementing features disclosed herein.

The application server 106 may further include a user interface module 138 that provides an e-mail, short message system (SMS), or web (e.g., HTML via HTTP) interface for communicating with one or more electronic devices 114. In one embodiment, the user interface module 138 is further configured to distribute reduced size images and other data to electronic devices 114 in response to, or in coordination with, one or more application modules 120 of the televisions 104. The application server 138 may maintain user data based on an account, which in one embodiment is tied to an email or other identifier. The managing user of the account may add televisions 104 to the account using a serial number associated with the television 104 or by accessing the server 106 from a particular television that can automatically provide identifying information such as a serial number while accessing the application server 106.

The electronic device 114 may include a memory, processor, storage, a display, and one or more user input devices to provided a user interface configured to monitor reduced sized images corresponding to programs being displayed on one or more of the televisions 104. In one embodiment, the electronic device 114 includes a web browser, e-mail client, SMS client, or other application 142 that is configured to communicate with the application server 106 and/or the televisions 104 to configure access to the televisions 104 and to receive monitoring data or other application specific data, either from the televisions 104 directly or via the application server 106. In one embodiment, the electronic device 114 communicates with the application server 106 via the network 110. In another embodiment, the electronic device communicates configuration information with the application server 106 which is provided by one of the televisions 104.

Figure 2:
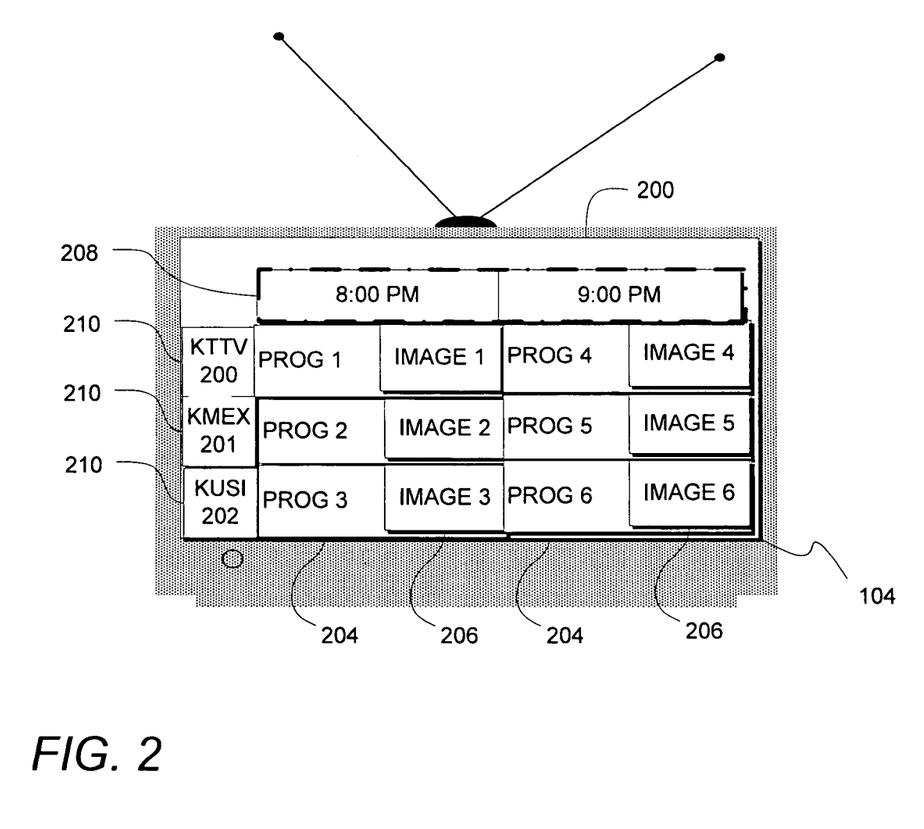
FIG. 2 illustrates a video display of an example of a program guide according to one embodiment of the system of FIG. 1.

FIG. 2 illustrates a video display of an example of a program guide 200 on the television 104 according to one embodiment of the system 100. The program guide includes program title or other description 204 and reduced size images 206 indicative of frames of the corresponding video programs. In the illustrated embodiment, the program guide 200 is organized according to a graphical indicators for a broadcast timeline 208 and text and/or graphical indicators of the broadcast channels 210. In one embodiment, a fixed image 206 may be displayed. In another embodiment, a series of images may be displayed periodically as an animation or slide show. The program guide may be scrollable to other times and channels and provide any other conventional program guide feature. While the illustrated guide is organized by channel and time, in other embodiments, the guide may be organized in any suitable fashion such as by program or program content.

In one embodiment, the images 206 may be selected for inclusion by the program provider or program guide provider. In another embodiment, such images 206 may be identified and/or provided by other viewers of the program, e.g., via the application manager 134. Such user identified frames may be indicative of particular actors, locales, popular scenes, etc. in the video program so as to provide the program guide viewer with visual information about the programs listed in the guide.

Figure 3A:
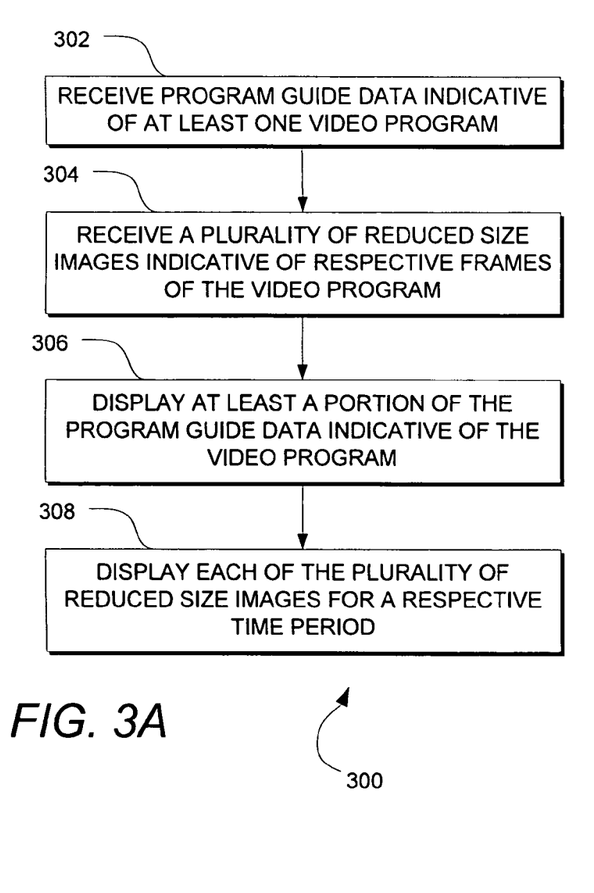
FIGS. 3A and 3B are flowcharts illustrating one embodiment of a method of providing a program guide such as illustrated by the interface of FIG. 2.

FIG. 3A is a flowchart illustrating one embodiment of a method 300 of providing a program guide on the television 104 such as illustrated by the interface 200. The method 300 begins at a block 302 in which the television 104, e.g., via a specific application module 120, receives program guide data indicative of at least one video program. Moving to a block 304, the television 104 receives a plurality of reduced size images indicative of respective frames of the video program. In one embodiment, the television 104 receives the guide data via, or in connection with, a television broadcast (e.g., over-the-air, cable, or satellite) receiver and the images via the network 110. In one embodiment, the television 104 receives the images in response to a query to the data agent 124 which obtains the images from a particular image generator 126 or a particular data repository 130 such as of the application server 106. Moving to a block 306, the television 104 displays at least a portion of the program guide data indicative of the video program. Next at a block 308, the television 104 displays each of the plurality of reduced size images, e.g., for a respective time period for each of the program guide entries that are displayed on the screen. In one embodiment, the television or other access device 104 comprises a set-top box or other receiver that is not integrated with a display. In such embodiments, the set-top box includes one or more of a general purpose or graphics processor or other display generator module that outputs the generated display to a display device.

Figure 3B:
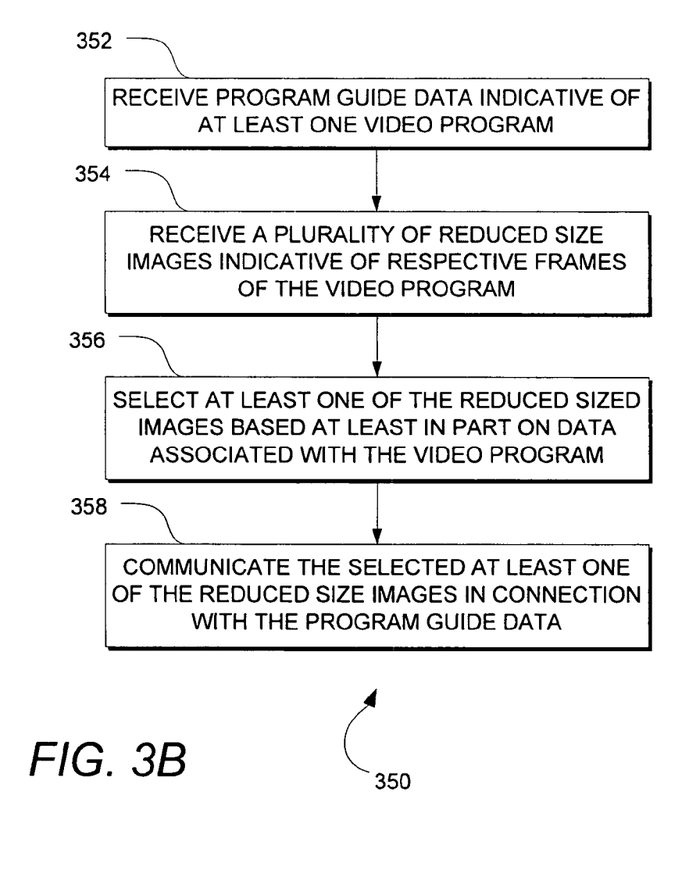

FIG. 3B is a flowchart illustrating one embodiment of a method 350 of providing data at the application server 106 for the program guide 200. The method 350 begins at a block 352 in which the application server 106 receives program guide data indicative of at least one video program. In one embodiment, the program guide data is received from the television 104 and is indicative of a particular video program for which guide images is requested. Next at a block 354, the application server 106 receives a plurality of reduced size images indicative of respective frames of the video program. In one embodiment, the application server 106 receives the images at its data repository 130 prior to receiving a request for images for particular program guide data. Such images may be received from the data collector 108, from the content provider of the video program, or from one or more televisions 104 in response to users marking scenes in the particular video program. Next at a block 356, the application server 106 selects at least one of the reduced sized images based at least in part on data associated with the video program. For example, in one embodiment, the application server 106 may select frames marked by users. In one embodiment, only a specified number of the most frequently marked frames or frames associated with a frequently marked portion (as determined by proximity of time codes) of the video program are selected. In one embodiment, the marker may be selected based on keywords in the program description from the program guide. Moving to a block 358, the application server 106 communicates the selected at least one of the reduced size images in connection with the program guide data, e.g., via the network 110.

Figure 4:
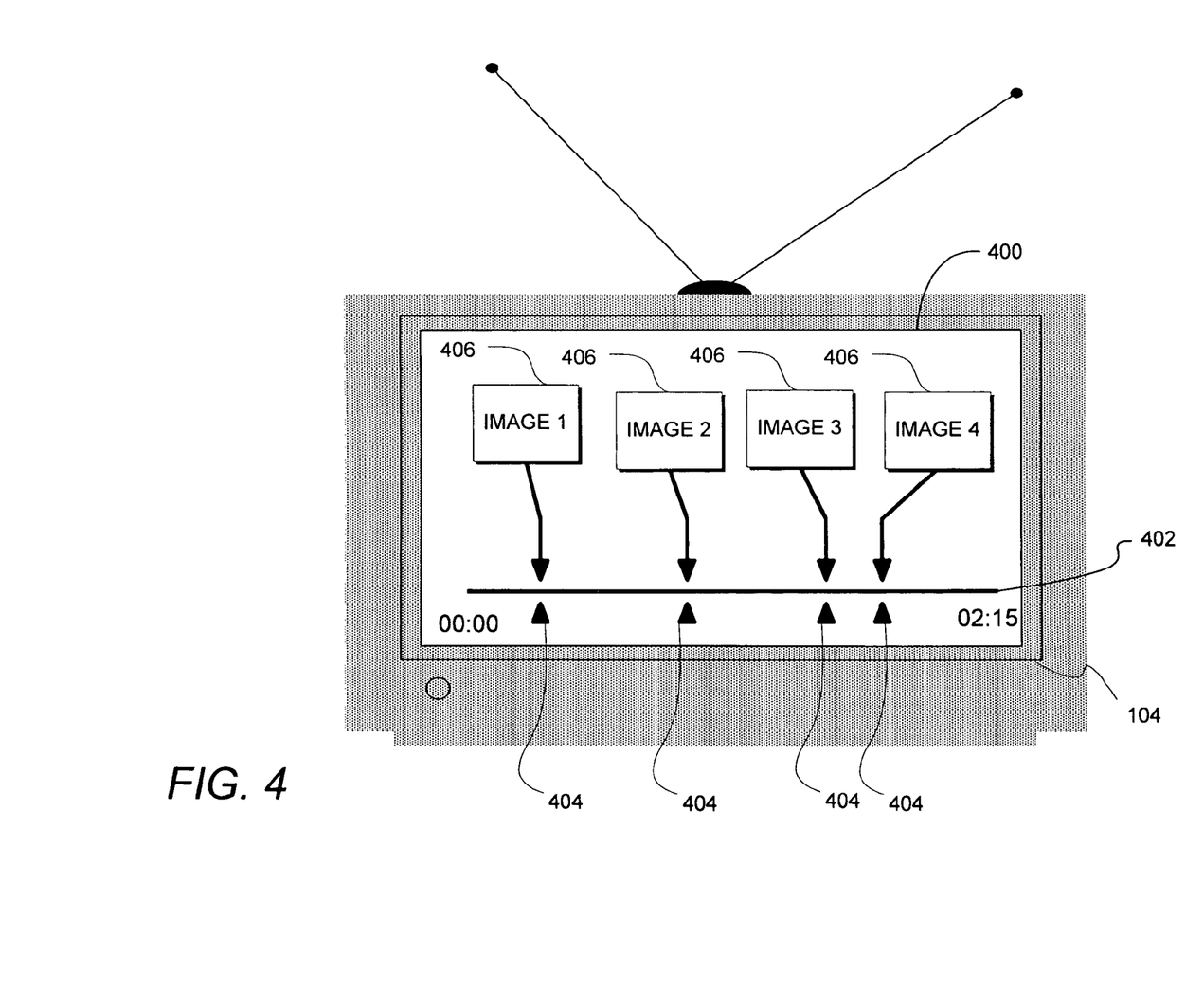
FIG. 4 illustrates a video display of an example of a user interface for viewing images according to a timeline of a video program according to one embodiment of the system of FIG. 1.

FIG. 4 illustrates a video display of an example of a user interface 400 for viewing images according to a timeline of a video program according to one embodiment of the system of FIG. 1. In one embodiment, the interface 400 is displayed upon receiving user input of a selected video program, such as from a program guide. In other embodiments, the interface 400 may be provided based on any other way of receiving a selection of a video program, such as based on the currently viewed program. In this embodiment, the television 104 receives one or more sets of reduced sized images at locations 406 corresponding to respective time offsets 404 during the time period or timeline 402 of all or a portion of a video program. The receiver displays the sets of images at the position 406 along a displayed timeline 402 to indicate the relative time position 404 in the program of the images. In one embodiment, the sets of images are provided based on markers of the viewer or other viewers from the application server 106. The markers may further comprise a caption or other data such as data indicative of the identity of the viewer who generated the marker. Such additional data may be displayed (not shown) proximal the respective images. The displayed caption may include information indicative of the corresponding scene, an actor in the scene, a location associated with the scene, or subject matter of the scene. The television 104 may be configured to filter the received markers based on viewer specified criteria (such as actor, content, or other program data) to find scenes satisfying the criteria. The displayed markers may also be indicative of markers that are selected based on viewer popularity of scenes. Popularity of particular frames may be determined, e.g., by the application server 106, based on the number of received markers associated or proximal to each frame or group of frames. The displayed images at the locations 406 may be single frames or short animations or slideshows comprising a plurality of reduced size images.

Figure 5:
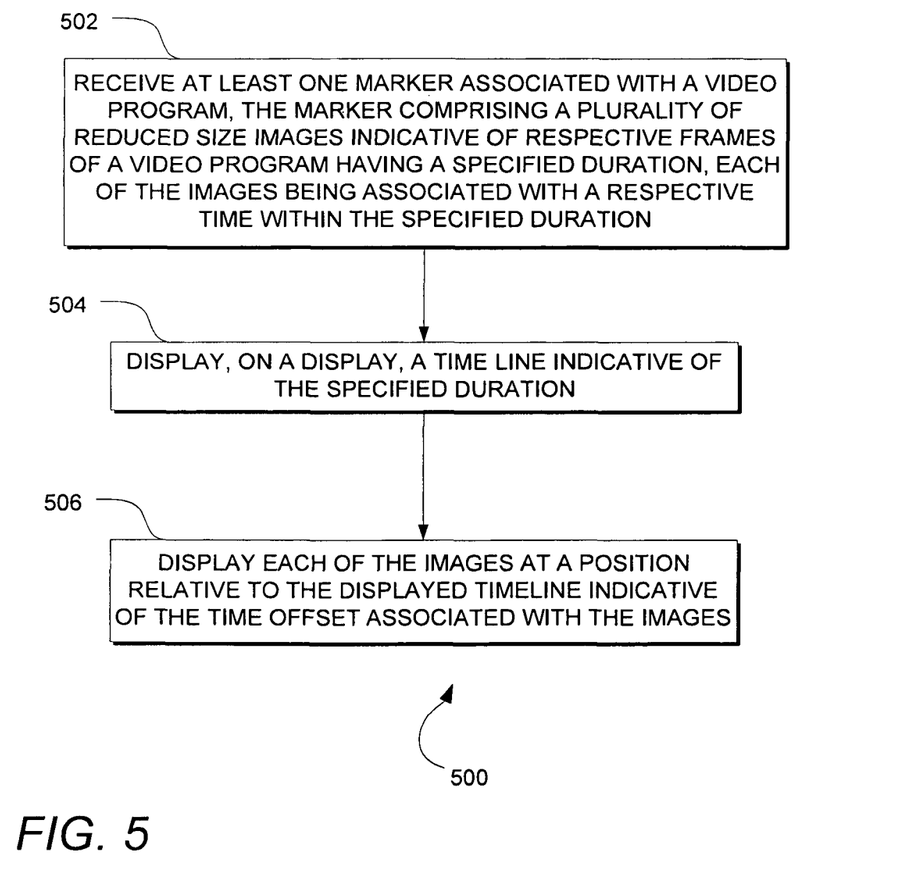
FIG. 5 is a flowchart illustrating one embodiment of a method of monitoring a video display such as illustrated by the interface of FIG. 4.

FIG. 5 is a flowchart illustrating one embodiment of a method 500 of displaying the timeline such as illustrated by the interface of FIG. 4. The method begins at a block 502 in which the television 502 receives at least one marker associated with a video program. The marker may include a plurality of reduced size images indicative of respective frames of a video program having a specified duration. Each of the images is associated with a respective time within the specified duration of the program. Next at a block 504, the television 504 displays, on a display associated with the television 104, a time line indicative of the specified duration. It is to be recognized that as noted elsewhere herein, the television 104 may comprises a video receiver unit that outputs a video signal to a separate video display. Displaying the time line may comprise displaying a time scale and one or more markers indicative of positions of markers along the time scale. Moving to a block 506, the television 104 displays each of the images at a position relative to the displayed timeline indicative of the time offset associated with the images. As noted above, the block 506 may be repeated periodically (optionally with different time periods for each position) for multiple images for each position to provide an animation or slideshow effect at each position.

Figure 6:
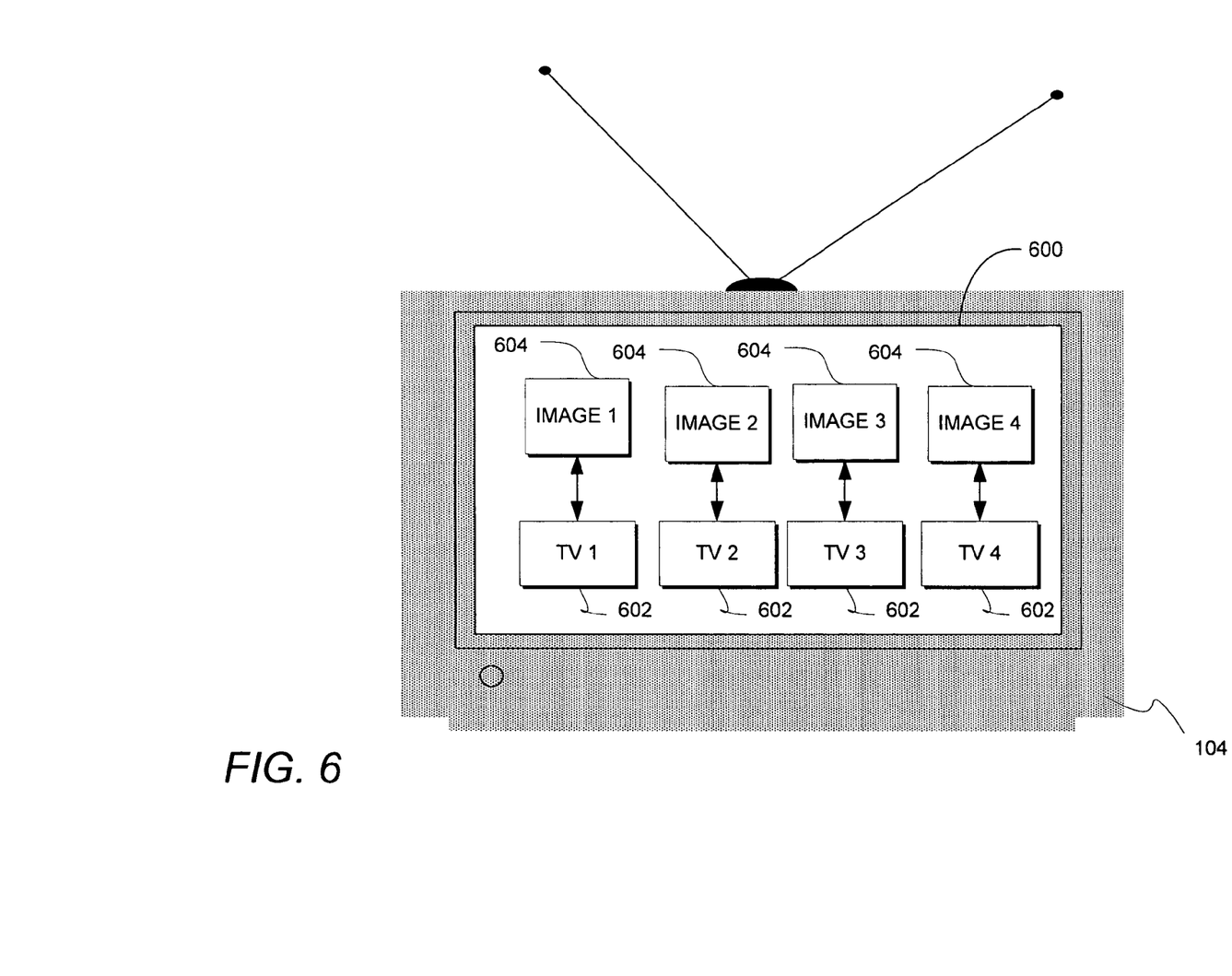
FIG. 6 illustrates a video display of an example of a user interface for monitoring other video receivers according to one embodiment of the system of FIG. 1.

FIG. 6 illustrates the television 104 displaying of an example of a user interface 600 for monitoring other video receivers or televisions 104 according to one embodiment of the system 100. In this embodiment, the television 104 is configured to communicate via the data network 110 with one or more other televisions 104 to receive reduce sized images 604 indicative of frames of video being displayed by the other televisions 104. The television 104 displays such images along with display fields 602 that include information indicative of the corresponding television so as to provide a viewer such as a parent a way of monitoring what programs are being viewed on the other video receivers.

In one embodiment, the televisions 104 in a particular home network provided by the gateway 112 implement a discovery protocol to identify televisions 104 available to be monitor. In one embodiment, the interface 600 of a particular television 104 includes all other of such discovered televisions 104. In another embodiment, the viewer selects a subset of the other televisions 104 to view.

In one embodiment, instead of the television 104, the electronic device 114 receives, directly from the other televisions 104 or via the application server 106, the reduced size images and displays the images and other monitoring data thereby providing such monitoring from any networked location. In such an embodiment, the televisions 104 may identify their availability for monitoring to the application server 106 which then forwards displayed frame information from the monitored televisions 104 to the electronic device 114.

The displayed images 604 may include images indicative of each keyframe of the video program being viewed on the respective television, periodically updated images corresponding to the displayed portion of the video program, or images indicative of marked portions of the video program.

Figure 7:
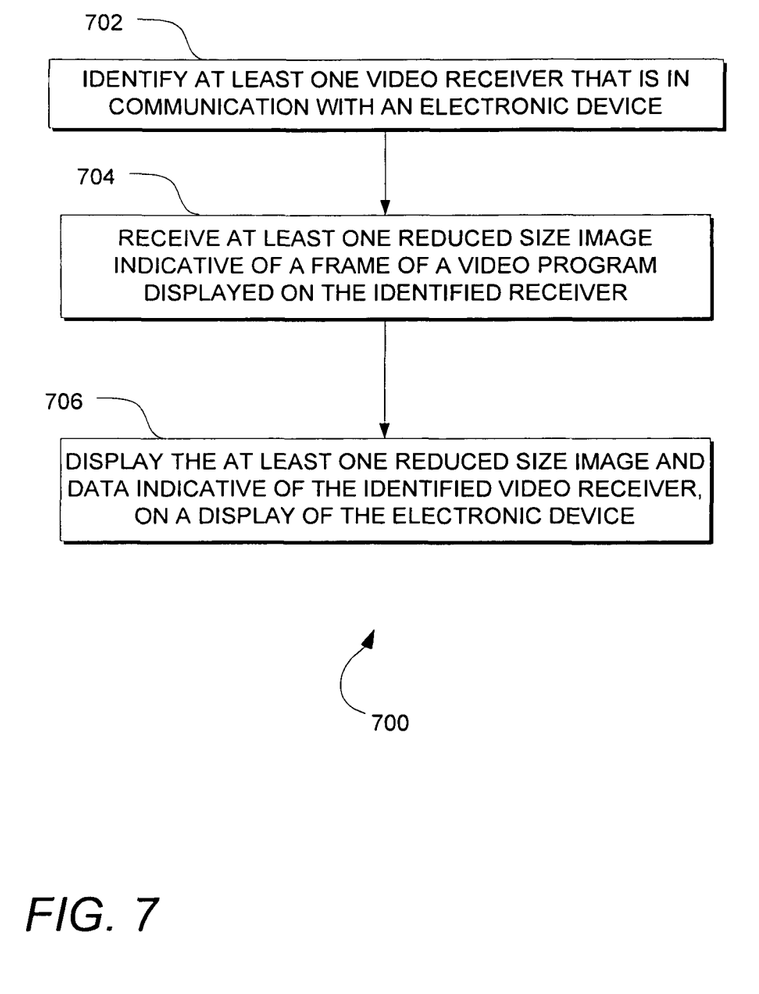
FIG. 7 is a flowchart illustrating one embodiment of a method of monitoring a video display such as illustrated by the interface of FIG. 6.

FIG. 7 is a flowchart illustrating one embodiment of a method 700 of monitoring a video display such as illustrated by the interface 600 of FIG. 6. The method 700 begins at a block 702 in which the television 104 identifies at least one other television that is in communication with television 104. In one embodiment, the television 104 identifies the at least television 104 based on receiving data from the other television 104 via the network 110 (or home network via the gateway 112) using, for example, any suitable network device discovery protocol including those known in the art. In one embodiment, the television 104 displays a user interface providing a control for user to select the television 104 to monitor and receives user input indicative of selecting a particular television 104 for monitoring.

Next at a block 704, the monitoring television 104 receives at least one reduced size image indicative of a frame of a video program displayed on the identified television(s) 104. In one embodiment, the identified (and monitored) televisions include the image generator 126 and parser 128 and provide images corresponding to all keyframes, or selected ones of the keyframes, e.g., keyframes selected at a specified interval.

In another embodiment, the monitored televisions 104 provide the monitoring television 104 with data such as time codes indicative of currently displayed keyframes. The monitoring television 104 then requests and receives corresponding images from the application server (e.g., via its data repository 130). In yet another embodiment, the monitoring television 104 receives data indicative of the currently displayed video program from the monitored television 104 and requests available markers from the application sever 134 and/or the data repository 130 of the monitoring television 104 and receives images associated with those markers.

Moving to a block 706, the monitoring television 104 displays the received reduced size images and data indicative of the identified and monitored televisions 104 on a display associated with the television 104. In one embodiment, the displayed image is updated periodically at a specified period (via system setup or user configuration) or as images are received. In the embodiment in which images associated with markers are displayed, the images of each marker and of different markers may be displayed as an animation or slideshow while the particular program is displayed by the corresponding monitored television 104.

Figure 8:
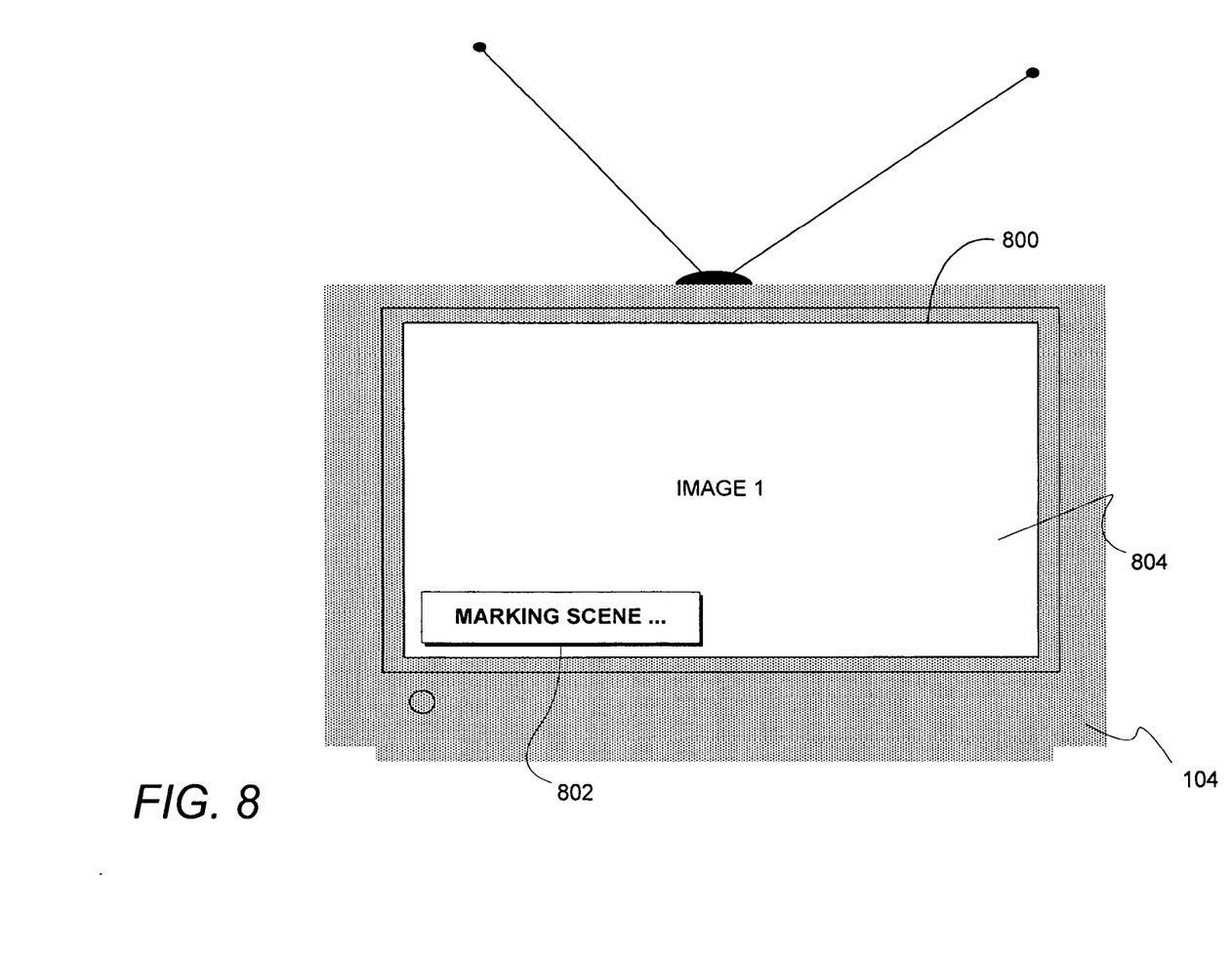
FIG. 8 illustrates a video display of an example of a user interface for marking a scene of a video program according to one embodiment of the system of FIG. 1.

FIG. 8 illustrates the television 104 displaying of an example of a user interface 800 marking a scene of a video program according to one embodiment of the system 100. In response to viewer input, such as from a remote control of the television 104, the television provides visual and/or audio feedback indicating that the scene is marked. In one embodiment, a further interface is displayed for the viewer to provide a caption for the marked scene and/or for receiving identification of the viewer. The television 104 may then select one or more proximal frames, e.g., one or more proximal keyframes to associate with the marker. In one embodiment, the viewer provides input via the remote control to delineate a start and end of a scene. In this embodiment, the television 104 identifies all or a selected portion (e.g., reduced in number) of the keyframes in the delineated scene to associate with the marker.

Figure 9A:
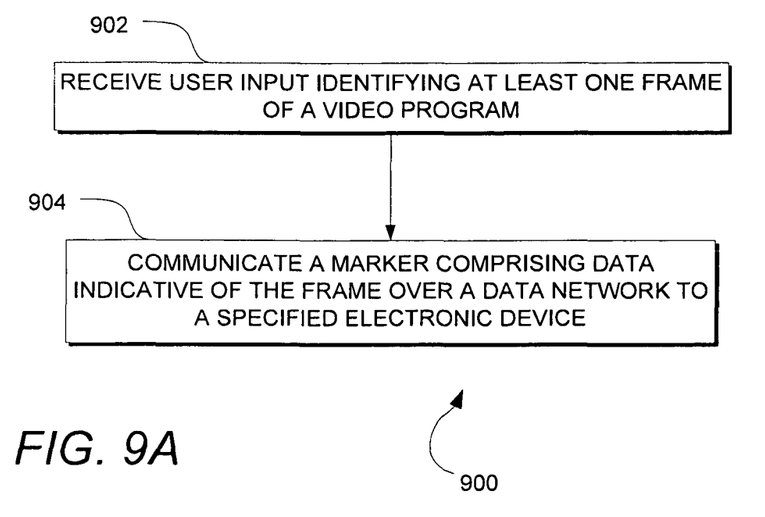
FIG. 9A is a flowchart illustrating one embodiment of a method of marking a scene of a video program, such as illustrated by the interface of FIG. 8.

FIG. 9A is a flowchart illustrating one embodiment of a method 900 of marking a scene of a video program, such as illustrated by the interface 800 of FIG. 8. The method 900 begins at a block 902 in which the television 104 receives user input identifying at least one frame of a video program. The user input may identify a particular time code or proximal keyframe in the video program. The user input may also delineate a portion or scene of the video program. Next at a block 904, the television 104 communicates a marker comprising data indicative of the identified frame(s) over the data network 110 to a specified electronic device such as the application server 106. The marker may comprise data identifying the video program and a time code or other data indicative of the identified frame(s) or corresponding reduced size images provided by the data agent 124. The marker may optionally include a caption provided by the user and associated with the identified frame(s). The marker may also include information identifying the viewer of the program. In one embodiment, the markers are communicated to the application server 106, which stores the markers in the data repository 106. In another embodiment, the markers are communicated to the data repository of the television 106 or to data repositories 130 of other televisions 104 in communication with the television 104 on which the marker is generated.

Figure 9B:
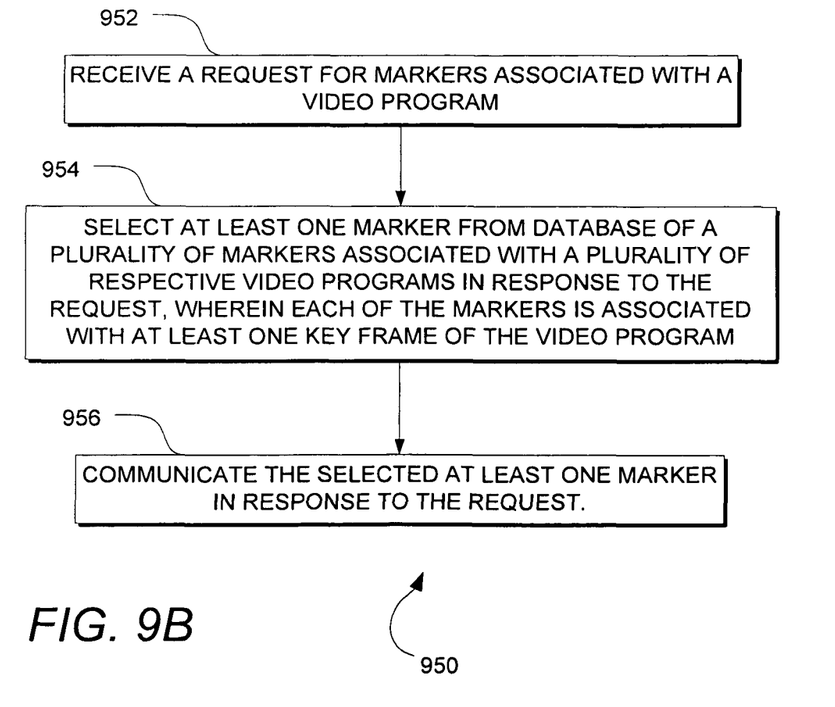
FIG. 9B is a flowchart illustrating one embodiment of a method of processing markers associated a scene of a video program, such as generated according to the method of FIG. 9A.

FIG. 9B is a flowchart illustrating one embodiment of a method 950 of processing markers associated a scene of a video program by the application server 106. The method 950 begins at a block 952 in which the application server 106 receives a request for markers associated with a video program. At a block 954, the application server 106 selects at least one marker from database of a plurality of markers, such as provided by the data repository 130, associated with a plurality of respective video programs in response to the request. Each of the selected markers is associated with at least one key frame and a corresponding reduced size image of the video program. In one embodiment, the request comprises a request for program guide data. In one embodiment, the request comprises a request for markers associated with a specified time period of the video program. In one embodiment, the selecting is based on a criteria specified by the request such as at least one of an actor, a location, or an activity associated with the portion of the video program. Moving to a block 956, the application server 106 communicates the selected at least one marker in response to the request to the requesting television 104 or other electronic device 114.

It is to be recognized that while FIG. 9B is discussed with respect to the method 950 being performed by the application server 106, in one embodiment, the marker storage and selection process of the method 950 may be provided in a distributed fashion by one or more televisions 104.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Figure 10:
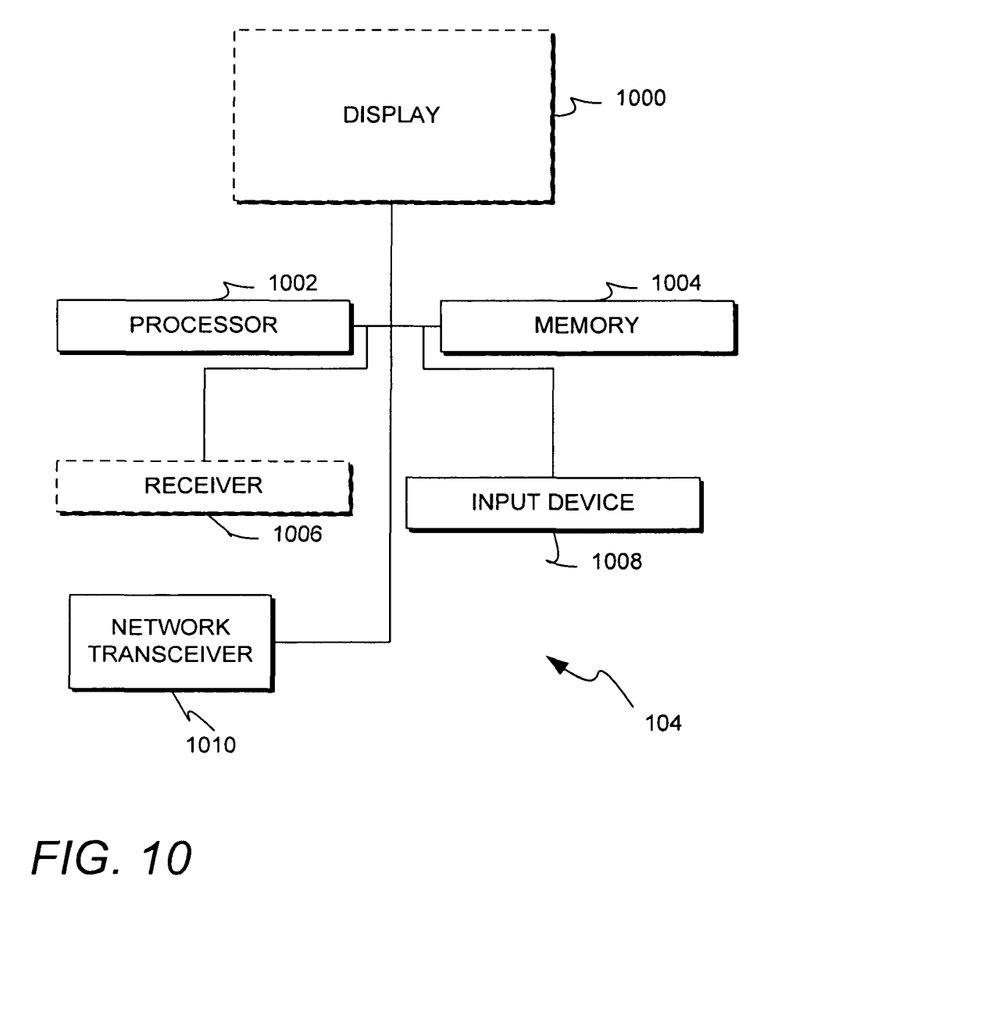
FIG. 10 is a front view of one embodiment of an access device such as illustrated in FIG. 1.

FIG. 10 is a block diagram illustrating components of one embodiment of a television or other media access device 104 of the system 100. The access device 104 may optionally include a display 1000 (e.g., when embodied in a television). A processor 1002 may communicate with the display 1000 and a memory 1004, a receiver 1006, an input device 1008 such as a front panel control or a remote control, and optionally with a network transceiver 1010 for communicating with other access devices 104, the application server 106, or electronic devices 114. The processor 1002 may be configured to perform the various functions associated with the television or other device 104. In one embodiment, the memory 1004 includes an instruction storage medium having instructions (or data indicative of such instructions where the instructions are stored in compressed or encrypted form) that causes the processor 1002 to the perform functions associated with the device 104. In addition, or instead of the control device 1008, the television 104 may implement any other suitable input mechanism including those discussed above with reference to identifying a viewer. The network transceiver 1010 may comprise any suitable network interface such as wired or wireless Ethernet and be configured to communicate with the application server 106 via the network 110.

Those of skill will recognize that the various illustrative logical blocks, modules, circuits, and algorithm steps described in connection with the embodiments disclosed herein may be implemented as electronic hardware, computer software executed by on or more processors, or combinations of both. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method comprising:
    receiving program guide data indicative of at least one video program;
    receiving at least one reduced size image indicative of at least one respective frame of the at least one video program;
    displaying an electronic program guide on a media access device, wherein the electronic program guide includes at least a portion of the program guide data and at least a portion of the at least one reduced size image;
    receiving input indicating a selection of a video program from the program guide; and
    in response to the input received:
        requesting one or more reduced size images associated with the selected video program from a data repository;
        receiving at least one set of reduced size images associated with the selected video program from the data repository, wherein each set of reduced size images is indicative of respective frames of a selectively marked scene of the selected video program, and each reduced size image is associated with a respective time within a duration of the selected video program;
        selecting one or more scenes of the selected video program satisfying at least one criteria by filtering the at least one set of reduced size images associated with the selected video program based on the at least one criteria;
        displaying a time line indicative of the duration of the selected video program; and
        for each selected scene, displaying a set of reduced size images indicative of respective frames of the selected scene at a position relative to the time line indicative of a time offset associated with the set of reduced size images.

2. The method of claim 1, wherein each set of reduced size images is indicative of a plurality of key frames of the selected video program.

3. The method of claim 1, further comprising:
    for at least one set of reduced size images, displaying each reduced size image of the set of reduced size images sequentially for a respective time period.

4. The method of claim 1, wherein each set of reduced size images has a vertical resolution of less than 480 lines, and respective frames for the set of reduced size images have a vertical resolution of one of 480, 720, or 1080 lines.

5. The method of claim 1, wherein each set of reduced size images is indicative of respective frames of a viewer selectively marked scene of the selected video program.

6. The method of claim 1, wherein each selectively marked scene of the selected video program is associated with at least one of an actor, a location, or an activity.

7. The method of claim 1, wherein the at least one set of reduced size images associated with the selected video program is indicative of viewer popularity, within a community of viewers, of at least one selectively marked scene.

8. The method of claim 1, further comprising:
    receiving the at least one set of reduced size images associated with the selected video program from the data repository over a data network.

9. The method of claim 1, wherein the at least one criteria is associated with at least one of an actor, a location, or an activity.

10. The method of claim 1, wherein the at least one criteria includes data indicative of viewer popularity, within a community of viewers, of at least one selectively marked scene of the selected video program.

11. The method of claim 1, further comprising:
    receiving the at least one reduced size image over a data network.

12. The method of claim 1, further comprising:
    displaying each of the at least one reduced size image periodically in an order for displaying a slide show.

13. The method of claim 1, wherein the at least one criteria comprises one of a predetermined number of most frequently marked frames, frames associated with a frequently marked portion based on proximity of time codes, or based on keywords in the program guide data.

14. The method of claim 1, further comprising:
    displaying the at least one reduced size image as an animation for displaying a moving scene of the selected video program.

15. A method comprising:
receiving program guide data indicative of at least one video program;
receiving at least one reduced size image indicative of at least one respective frame of the at least one video program;
displaying an electronic program guide on a media access device, wherein the electronic program guide includes at least a portion of the program guide data and at least a portion of the at least one reduced size image;
receiving input indicating a selection of a video program from the program guide; and
in response to the input received:
 querying a data repository for at least one marker associated with the selected video program;
 receiving at least one marker associated with the selected video program, wherein each marker comprises a set of reduced size images indicative of respective frames of a selectively marked scene of the selected video program, and each reduced size image is associated with a respective time within a duration of the selected video program;
 selecting one or more scenes of the selected video program satisfying at least one criteria by filtering the at least one marker associated with the selected video program based on the at least one criteria;
 displaying a time line indicative of the duration of the selected video program; and
 for each selected scene, displaying a set of reduced size images indicative of respective frames of the selected scene at a position relative to the time line indicative of a time offset associated with the set of reduced size images.

16. The method of claim 15, wherein each selectively marked scene of the selected video program is associated with at least one of an actor, a location, viewer popularity, or an activity.

17. The method of claim 15, wherein each set of reduced size images is indicative of respective frames of a viewer selectively marked scene of the selected video program.

18. The method of claim 15, wherein:
each marker further comprises a caption associated with a set of reduced size images of the marker; and
for each selected scene, displaying a set of reduced size images indicative of respective frames of the selected scene at a position relative to the time line indicative of a time offset associated with the set of reduced size images further comprises displaying a caption associated with the set of reduced size images proximal to the position of the set of reduced size images.

19. The method of claim 18, wherein a caption of a marker comprises data indicative of a viewer identity.

20. The method of claim 15, further comprising:
receiving a video program;
identifying a plurality of frames of the video program; and
generating, for each of the identified frames, a reduced size image indicative of the identified frame, wherein the reduced size image has a vertical resolution of less than 480 lines, and the respective frame has a vertical resolution of one of 480, 720, or 1080 lines.

21. The method of claim 15, further comprising:
receiving the at least one reduced size image over a data network.

22. The method of claim 15, wherein the at least one criteria comprises one of a predetermined number of most frequently marked frames, frames associated with a frequently marked portion based on proximity of time codes, or based on keywords in the program guide data.

23. A system comprising:
one or more processors; and
a non-transitory processor-readable memory device storing instructions that when executed by the one or more processors cause the one or more processors to perform operations including:
 receiving program guide data indicative of at least one video program; and
 receiving at least one reduced size image indicative of at least one respective frame of the at least one video program;
 displaying an electronic program guide on a display, wherein the electronic program guide includes at least a portion of the program guide data and at least a portion of the at least one reduced size image;
 receiving input indicating a selection of a video program from the program guide; and
 in response to the input received:
  requesting one or more reduced size images associated with the selected video program from a data repository;
  receiving at least one set of reduced size images associated with the selected video program from the data repository, wherein each set of reduced size images is indicative of respective frames of a selectively marked scene of the selected video program, and each reduced size image is associated with a respective time within a duration of the selected video program;
  selecting one or more scenes of the selected video program satisfying at least one criteria by filtering the at least one set of reduced size images associated with the selected video program based on the at least one criteria;
  displaying a time line indicative of the duration of the selected video program; and
  for each selected scene, displaying a set of reduced size images indicative of respective frames of the selected scene at a position relative to the time line indicative of a time offset associated with the set of reduced size images.

24. The system of claim 23, wherein the system further comprises the display.

25. The system of claim 23, wherein the instructions when executed by the one or more processors cause the one or more processors to perform further operations including:
for at least one set of reduced size images, displaying each reduced size image of the set of reduced size images sequentially for a respective time period.

26. The system of claim 23, wherein each set of reduced size images has a vertical resolution of less than 480 lines, and respective frames for the set of reduced size images have a vertical resolution of one of 480, 720, or 1080 lines.

27. The system of claim 23, wherein the system further comprises at least one of a television, a video monitor, a cable set-top box, a satellite set-top box, a digital video recorder (DVR), or a video disc player.

28. The system of claim 23, wherein each set of reduced size images is indicative of a plurality of key frames of the selected video program.

29. The system of claim 23, wherein each set of reduced size images is indicative of respective frames of a viewer selectively marked scene of the selected video program.

30. The system of claim 23, wherein each selectively marked scene of the selected video program is associated with at least one of an actor, a location, or an activity.

31. The system of claim 23, wherein the at least one set of reduced size images associated with the selected video program is indicative of viewer popularity, within a community of viewers, of at least one selectively marked scene.

32. A non-transitory computer readable medium storing instructions that, when executed by one or more processors of a machine, cause the machine to perform operations comprising:

receiving program guide data indicative of at least one video program;

receiving at least one reduced size image indicative of at least one respective frame of the at least one video program;

displaying an electronic program guide on a display, wherein the electronic program guide includes at least a portion of the program guide data and at least a portion of the at least one reduced size image;

receiving input indicating a selection of a video program from the program guide; and in response to the input received:

requesting one or more reduced size images associated with the selected video program from a data repository;

receiving at least one set of reduced size images associated with the selected video program from the data repository, wherein each set of reduced size images is indicative of respective frames of a selectively marked scene of the selected video program, and each reduced size image is associated with a respective time within a duration of the selected video program;

selecting one or more scenes of the selected video program satisfying at least one criteria by filtering the at least one set of reduced size images associated with the selected video program based on the at least one criteria;

displaying a time line indicative of the duration of the selected video program; and for each selected scene, displaying a set of reduced size images indicative of respective frames of the selected scene at a position relative to the time line indicative of a time offset associated with the set of reduced size images.

33. The computer readable medium of claim 23, wherein each set of reduced size images is indicative of a plurality of key frames of the selected video program.

34. The computer readable medium of claim 23, the operations further comprising:

for at least one set of reduced size images, displaying each reduced size image of the set of reduced size images sequentially for a respective time period.

35. The computer readable medium of claim 23, wherein each set of reduced size images has a vertical resolution of less than 480 lines, and respective frames for the set of reduced size images have a vertical resolution of one of 480, 720, or 1080 lines.

36. The computer readable medium of claim 23, wherein each set of reduced size images is indicative of respective frames of a viewer selectively marked scene of the selected video program.

37. The computer readable medium of claim 23, wherein each selectively marked scene of the selected video program is associated with at least one of an actor, a location, or an activity.

38. The computer readable medium of claim 23, wherein the at least one set of reduced size images associated with the selected video program is selected based on data indicative of viewer popularity, within a community of viewers, of at least one selectively marked scene.

39. The computer readable medium of claim 23, the operations further comprising:

receiving the at least one reduced size image over a data network.

40. The computer readable medium of claim 23, wherein the at least one criteria is associated with at least one of an actor, a location, or an activity.

41. The computer readable medium of claim 39, wherein the at least one criteria includes data indicative of viewer popularity, within a community of viewers, of at least one selectively marked scene of the selected video program.

42. The computer readable medium of claim 23, wherein:

each set of reduced size images further comprises a caption associated with the set of reduced size images; and for each selected scene, displaying a set of reduced size images indicative of respective frames of the selected scene at a position relative to the time line indicative of a time offset associated with the set of reduced size images further comprises displaying a caption associated with the set of reduced size images proximal to the position of the set of reduced size images.

43. The computer readable medium of claim 32, the operations further comprising:

receiving a video program;

identifying a plurality of frames of the video program; and generating, for each of the identified frames, a reduced size image indicative of the identified frame, wherein the reduced size image has a vertical resolution of less than 480 lines, and the respective frame has a vertical resolution of one of 480, 720, or 1080 lines.

44. The computer readable medium of claim 32, wherein the at least one criteria comprises one of a predetermined number of most frequently marked frames, frames associated with a frequently marked portion based on proximity of time codes, or based on keywords in the program guide data.

* * * * *